(12) United States Patent
Dekel et al.

(10) Patent No.: US 12,242,692 B1
(45) Date of Patent: Mar. 4, 2025

(54) CONTROLLING TOUCH OPERATION MODES FOR TOUCH SENSORS UTILIZING DETERMINED TOUCH USAGE PROBABILITY

(71) Applicant: Microsoft Technology Licensing, LLC, Redmond, WA (US)

(72) Inventors: Shoham Dekel, Tel Aviv (IL); Uri Ron, Kfar Saba (IL); Idan Palmor, Ramat Gan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/397,534

(22) Filed: Dec. 27, 2023

(51) Int. Cl.
| | | |
|---|---|---|
| *G06F 3/0346* | (2013.01) | |
| *G06F 1/3231* | (2019.01) | |
| *G06F 1/3296* | (2019.01) | |
| *G06F 3/01* | (2006.01) | |
| *G06F 3/041* | (2006.01) | |

(52) U.S. Cl.
CPC ........ *G06F 3/04166* (2019.05); *G06F 1/3231* (2013.01); *G06F 1/3296* (2013.01); *G06F 3/012* (2013.01); *G06F 3/013* (2013.01); *G06F 3/0346* (2013.01)

(58) Field of Classification Search
CPC .... G06F 3/04166; G06F 1/3231; G06F 3/012; G06F 3/013; G06F 3/0346
See application file for complete search history.

(56) References Cited

U.S. PATENT DOCUMENTS

| | | | |
|---|---|---|---|
| 6,025,698 A | 2/2000 | Hong et al. | |
| 6,079,025 A | 6/2000 | Fung et al. | |
| 6,192,480 B1 | 2/2001 | Barrus | |
| 8,816,985 B1* | 8/2014 | Tate | ................. G06F 3/041661 |
| | | | 345/173 |
| 2004/0163003 A1 | 8/2004 | Dutton et al. | |
| 2010/0131785 A1 | 5/2010 | Blackburn et al. | |
| 2015/0234446 A1* | 8/2015 | Nathan | ................. G06F 3/0445 |
| | | | 345/174 |
| 2018/0196499 A1 | 7/2018 | Chng et al. | |
| 2020/0053257 A1 | 2/2020 | Sreepathihalli et al. | |
| 2022/0171451 A1 | 6/2022 | Lingutla et al. | |

FOREIGN PATENT DOCUMENTS

| | | |
|---|---|---|
| EP | 3291047 A1 | 3/2018 |
| WO | 2022231602 A1 | 11/2022 |

* cited by examiner

*Primary Examiner* — Kevin M Nguyen
(74) *Attorney, Agent, or Firm* — Alleman Hall & Tuttle LLP

(57) ABSTRACT

One example provides a computing device comprising a display, a touch sensor operatively coupled to the display, a non-touch sensor configured to provide an output indicative of user engagement between the computing device and a user of the computing device, a logic machine, and a storage machine. The storage machine comprises instructions executable by the logic machine to determine a touch usage probability based at least upon the output from the non-touch sensor. The instructions are further executable to change the operation of the touch sensor between an idle mode and a scanning mode based at least on the touch usage probability meeting a probability threshold condition.

20 Claims, 8 Drawing Sheets

CONTROLLING TOUCH OPERATION MODES FOR TOUCH SENSORS UTILIZING DETERMINED TOUCH USAGE PROBABILITY

BACKGROUND

Computing devices, such as laptop computers, tablet computers, and smart phones, may be configured to receive inputs via a touch-sensitive display. Such devices may use a touch sensor to determine a touch input location (e.g. finger and/or pen) on the display. Latency and accuracy of determining a touch location can be measures of touch sensor performance. Shorter latency and higher accuracy can indicate higher touch sensor performance, while longer latency and lower accuracy can indicate lower touch sensor performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a computing device comprising a display, a touch sensor operatively coupled to the display, and a non-touch sensor. The non-touch sensor is configured to provide an output indicative of user engagement between the computing device and a user of the computing device. The computing device further comprises a logic machine and a storage machine. The storage machine comprises instructions executable by the logic machine to determine a touch usage probability based at least upon the output from the non-touch sensor. The instructions are further executable to change the operation of the touch sensor between an idle mode and a scanning mode based at least on the touch usage probability meeting a probability threshold condition.

DETAILED DESCRIPTION

Figure 1B:
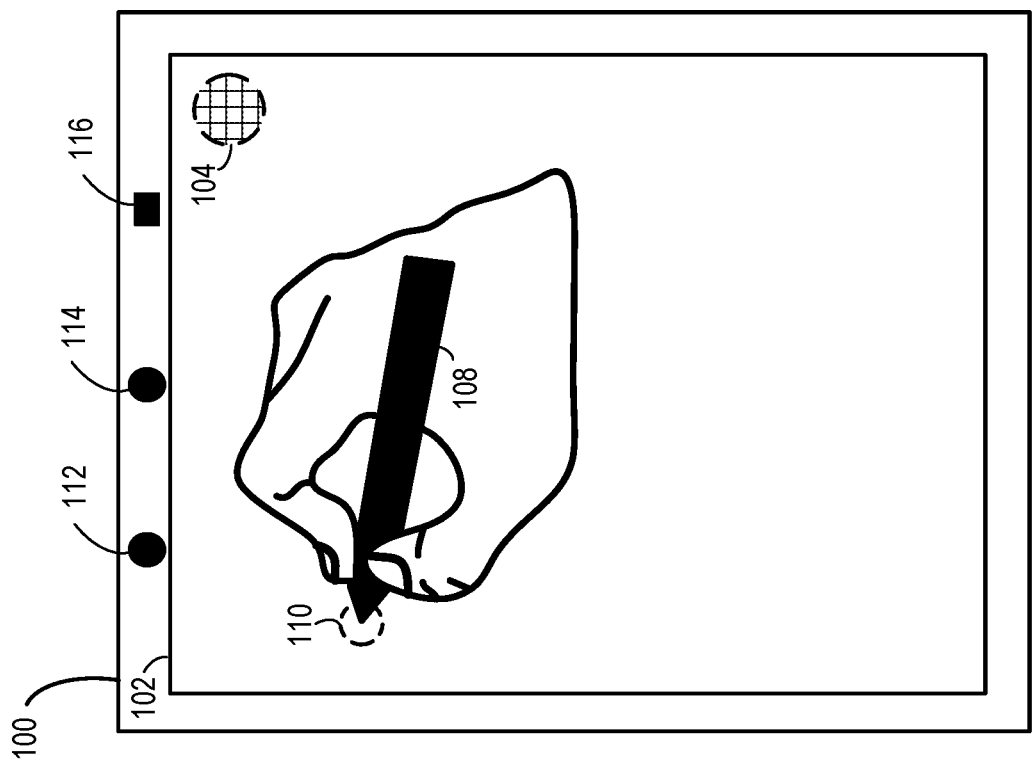
FIGS. 1A and 1B schematically illustrate an example computing device utilizing finger touch input and pen touch input, respectively.

Higher touch sensor performance may be desired for a touch sensor. However, higher performance operation can involve more frequent scanning of a sensor array of a touch sensor. Such more frequent scanning can consume unnecessary power and may result in excess drain on a battery of the computing device at times when the likelihood of a user making a touch input is relatively lower. Therefore, a computing device that utilizes a touch sensor may reduce a touch sensor scanning rate to lower power consumption by operating in a lower-power mode (e.g., idle mode) when expected touch input is infrequent. However, reducing the scanning rate in the idle mode may result in increasing the latency compared to the shorter latency of the touch sensor with the higher scanning rate in the higher performance mode. In this manner, the selection of which touch power mode to use for the operation of the touch sensor can involve a tradeoff between higher touch performance and the lower power of the touch sensor. Current solutions exit the idle mode and enter the scanning mode when a touch input is sensed on the display. However, the current decision solutions may result in lower touch performance that is noticeable to a user of the computing device due to less frequent scanning used in an idle mode.

Accordingly, examples are disclosed that relate to controlling touch power modes of a touch sensor by using a determined touch usage probability. Briefly, a computing device comprises a display, a touch sensor operatively coupled to the display, and one or more non-touch sensors. At least one non-touch sensor can provide an output indicative of user engagement between the computing device and a user of the computing device. Further, the computing device comprises instructions executable by a logic machine to operate the touch sensor in an idle mode, and determine a touch usage probability of the display based the output of the non-touch sensor. Alternatively or additionally, in some examples, another parameter (e.g. a processor state) can be used as an indicator of a user engagement. Based at least on the touch usage probability meeting a probability threshold condition, the instructions change the operation of the touch sensor from the idle mode to a scanning mode. As used herein, the term "scanning mode" is an operation mode of the touch sensor that has higher power than the idle mode. Likewise, the term "idle mode" represents a lower power touch sensor operating state than the scanning mode that is used based at least on touch usage probability being below the probability threshold condition for the scanning mode. This can enable the touch sensor to exit the idle mode based at least on a likelihood of touch input or pen input meeting a desired threshold condition. Updating the operating state of the touch sensor using a touch usage probability based upon various sensor outputs and/or indicators can help to provide accurate touch input sensing more quickly than exiting idle mode upon detecting a touch input.

Figure 1A:
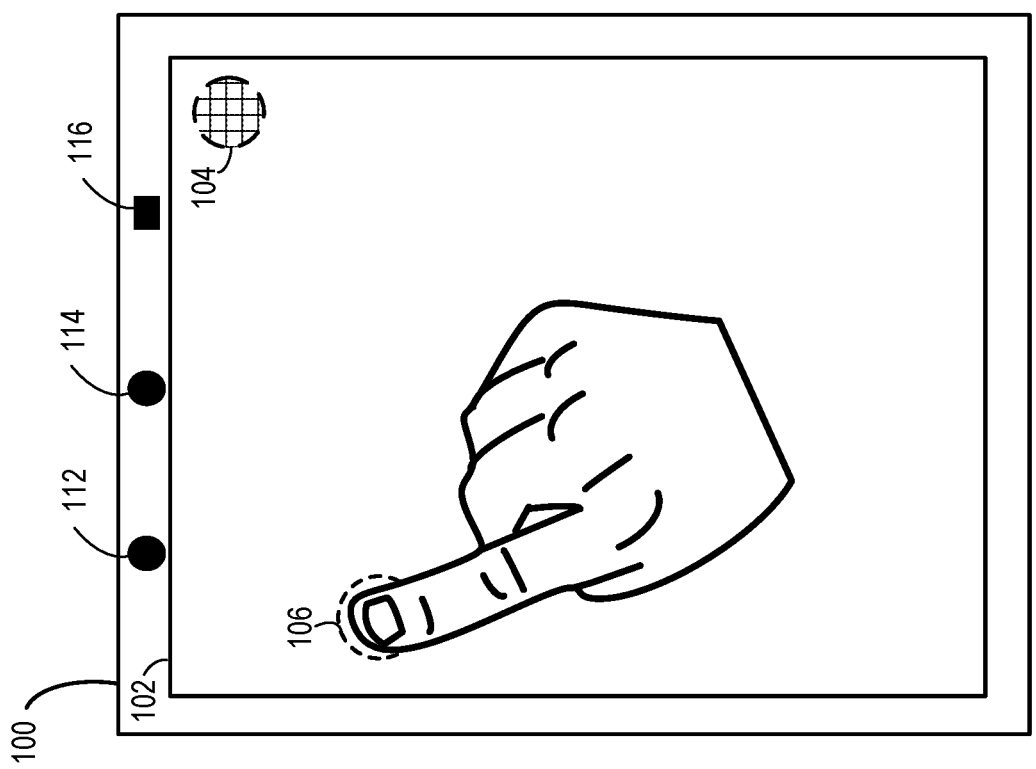

FIGS. 1A and 1B schematically depict an example computing device 100 in the form of a tablet. Computing device 100 comprises a display 102 on which a user is making a touch input with a finger. Computing device 100 also comprises a touch sensor 104 that is operatively coupled to display 102. Touch sensor 104 is configured to detect a touch location 106 of a touch input. Alternatively or additionally, a pen 108 can be used for touch input on display 102. In such examples, touch sensor 104 is configured to detect a pen location 110 on display 102, as illustrated in FIG. 1B.

Computing device 100 further comprises various non-touch sensors. A head tracking system includes a first camera 112 to detect a head direction of a user of computing device 100. An eye tracking system includes a second camera 114 to detect an eye gaze of the user. Additionally, an inertial measurement unit (IMU) 116 can track motion of computing device 100, such as motion resulting from the user.

Figure 2B:
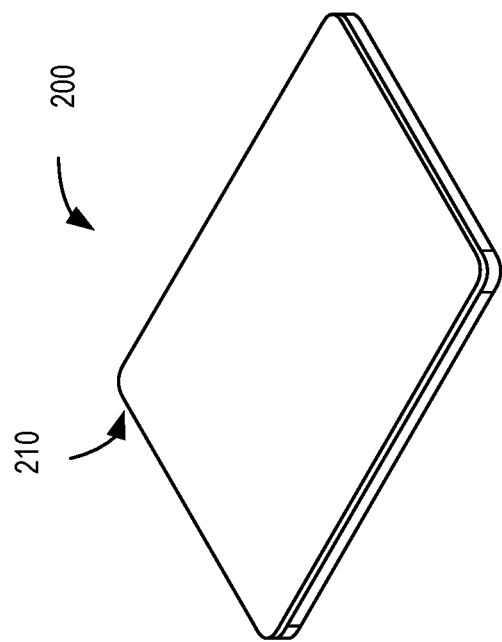
FIGS. 2A and 2B schematically depict another example computing device in the form of a laptop.
Figure 2A:
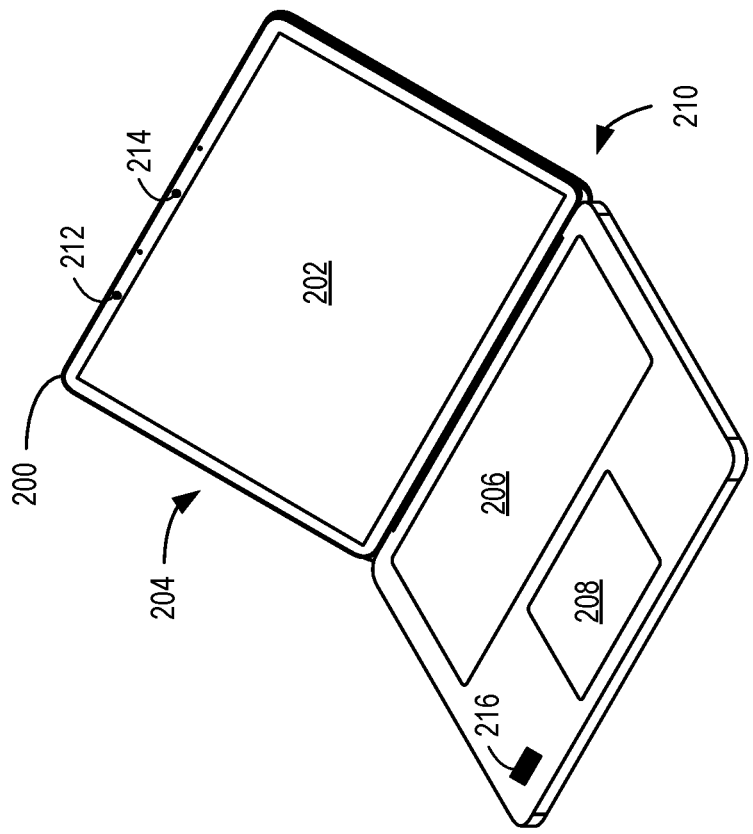

FIGS. 2A and 2B schematically depict another example computing device 200 in the form of a laptop. Similar to computing device 100, computing device 200 comprises a display 202 and a touch sensor 204 operatively coupled to display 202. Computing device 200 further includes an attached keyboard 206, a touch pad 208, and a hinge 210. Touch pad 208 utilizes a touch input to control an aspect of computing system 200, such as a mouse pointer, for example. Hinge 210 enables display 202 to be placed in different orientations relative to attached keyboard 206. Computing device 200 further comprise a first camera 212 for a head tracking system, a second camera 214 for an eye tracking system, and an IMU 216 for motion tracking. In FIG. 2A, computing device 200 is depicted in an open configuration where a user of computing device 200 can be actively engaged with computing device 200. Alternatively, computing device 200 can be in a closed configuration as depicted in FIG. 2B. In other examples, display 202 can have another orientation. FIGS. 2A and 2B are illustrative.

Figure 3:
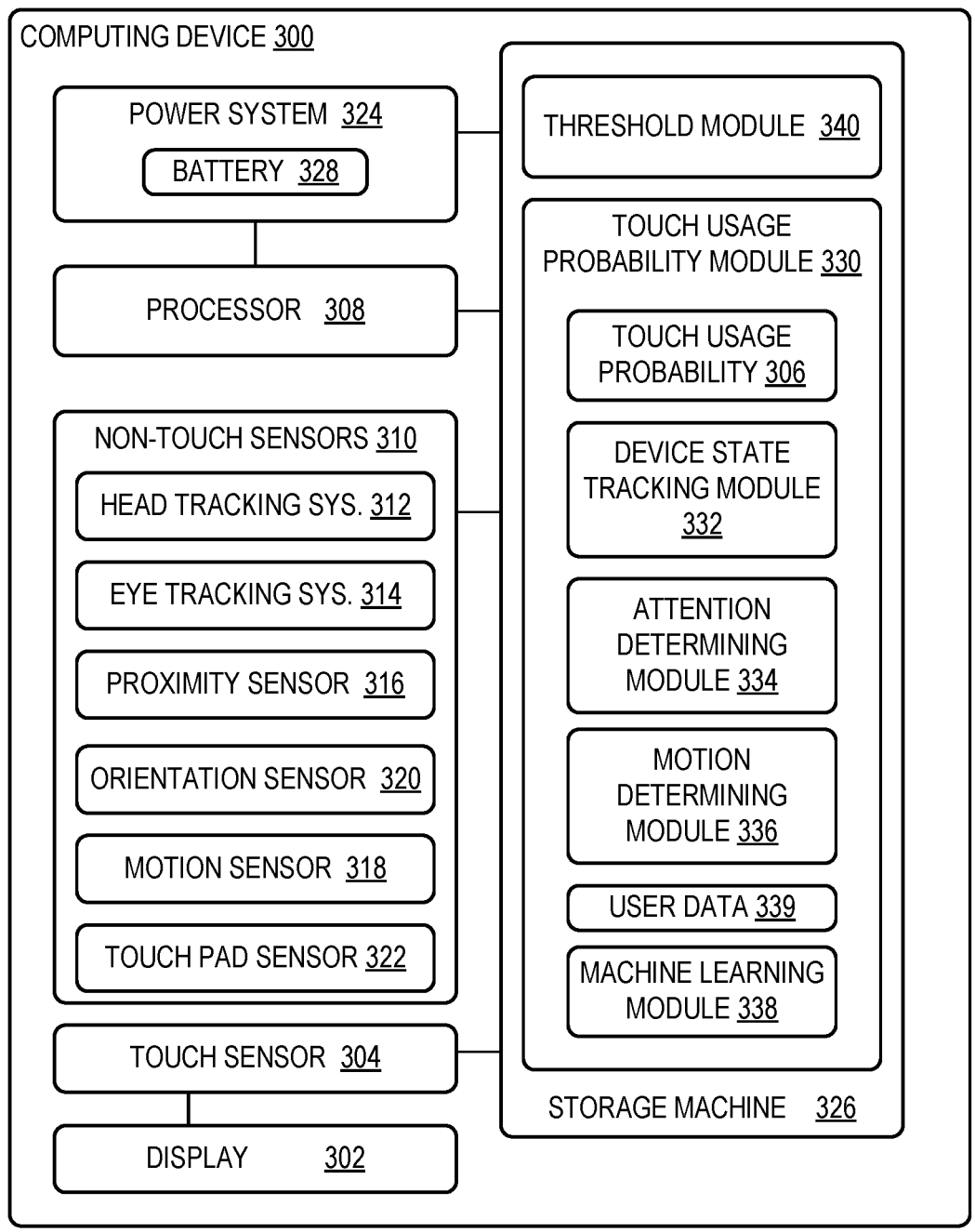
FIG. 3 depicts a block diagram of an example computing device.

FIG. 3 shows a block diagram of an example computing device 300. Computing device 100 and computing device 200 are examples of computing device 300. Other examples of computing device 300 include smartphones and other computing systems with a touch-sensitive display. Computing device 300 comprises a display 302 and a touch sensor 304 operatively coupled to display 302. Touch sensor 304 is configured to detect a touch location of one or more of a pen or finger on display 302. Touch sensor 304 is configured to operate in various touch power modes, such as an idle mode or a scanning mode, for example. Each touch power mode can comprise a specified latency, a specified location accuracy, and/or a specified touch power level. Touch sensor 304 can change touch power mode based at least on a touch usage probability 306 of display 302, as discussed in more detail below with reference to FIG. 4. In some examples, the touch power mode of touch sensor 304 can follow a power mode of computing device 300. Alternatively or additionally, a processor 308 can have permission to change touch sensor 304 from the idle mode to the scanning mode. In other examples, computing device 300 can comprise another touch-sensitive display and optionally another corresponding touch sensor.

Computing device 300 also comprises a plurality of non-touch sensors 310. At least one non-touch sensor 310 can provide an output indicative of a user engagement between computing device 300 and a user of computing device 300. As examples, computing device 300 comprises a head tracking system 312. The head tracking system 312 includes one or more cameras to provide an output indicative of a head direction of the user of computing device 300. The one or more cameras can include a depth camera, an intensity image camera (e.g., a color image camera, grayscale camera, or an infrared camera), and/or any other suitable camera. Additionally, the computing device 300 comprises an eye tracking system 314. The eye tracking system 314 includes one or more light sources and one or more image sensors to capture and provide an image of an eye of the user. The computing device 300 further comprises a proximity sensor 316 configured to provide an output indicative of the presence of the user near computing device 300.

As further examples, the computing device 300 further comprises a motion sensor 318 configured to provide an output indicative of movement of computing device 300. In some examples, motion sensor 318 can also provide an output indicative of an orientation of the computing device 300 in space. Motion sensor 318 can include an inertial measurement unit (IMU) having one or more accelerometers, gyroscopes, and/or magnetometers. In some examples, other motion/position sensors, such as a global positioning system (GPS) sensor, may also be included. An orientation sensor 320 is configured to provide an output indicative of an orientation of display 302. In some examples, the orientation of display 302 can include an angle relative to a keyboard coupled to computing device 300, such as an attached keyboard for example. In other examples, the orientation of display 302 can include an angle relative to the direction parallel to gravity (e.g., vertical). An optional touch pad sensor 322 is configured to detect touch on a touch pad, when included. In other examples, another non-touch sensor can be included. In further examples, one or more of the depicted non-touch sensors may be omitted.

Computing device 300 further comprises a power system 324, processor 308, and a storage machine 326. Power system 324 is configured to provide power to computing device 300 from a battery 328 or an external power supply. In some examples, power system 324 can be configured to perform battery management for battery 328. Storage machine 326 stores instructions executable by processor 308 to implement a touch usage probability module 330 to determine a touch usage probability 306 of display 302. More particularly, touch usage probability module 330 utilizes one or more parameters for determining touch usage probability 306. A parameter can be an output from a non-touch sensor in plurality of non-touch sensors 310. Alternatively, a parameter can be an indicator of a state of computing device 300. In some examples, touch usage probability module 330 can monitor the parameters in an interrupt-based manner, which can help to reduce power consumption compared to in a polling manner. In other examples, touch usage probability module 330 can poll for the parameters. An example pipeline for determining touch usage probability 306 is discussed with reference to FIG. 4.

Touch usage probability module 330 comprises a device state tracking module 332 configured to monitor one or more parameters that are indicators of the state of computing device 300. Example states of computing device 300 include active applications, charge of battery 328, peripheral devices connected (e.g., input devices and/or external power supply), and other suitable device states.

Touch usage probability module 330 further comprises an attention determining module 334 configured to determine a user attention based at least on a parameter that is an output from the plurality of non-touch sensors 310. Here, the output is indicative of user engagement between computing device 300 and the user of computing device 300. More particularly, the user attention indicates a likelihood that the attention of the user is directed towards display 302. In some examples, attention determining module 334 can be configured to determine the user attention by detecting the head direction of the user based at least on the output from head tracking system 312. Alternatively or additionally, attention determining module 334 can be configured to determine the user attention by determining a gaze direction of the user based at least on the output from eye tracking system 314. Further, attention determining module 334 can be configured to update the user attention based at least upon an updated gaze direction and/or head direction. This can provide the potential benefit, for example, of switching from an idle mode and a scanning mode before a touch input begins, based upon head tracking and eye tracking signals. This can provide for more accurate initial touch location determination than waiting for a touch input before changing from idle mode to scanning mode. In some examples, attention determining module 334 can also be configured to determine user presence using output from proximity sensor 316 to help determine the user attention. In other examples, attention determining module 334 can determine the user attention in another suitable manner.

Touch usage probability module 330 further comprises a motion determining module 336 configured to determine a motion classification of computing device 300 based at least on an output from motion sensor 318 and/or an output from orientation sensor 320. More particularly, the motion classification includes information relating to sensed movement and/or orientation of computing device 300 in space. Additionally, motion determining module 336 can also include information relating to a duration of the sensed movement of computing device 300, in some examples.

Touch usage probability module 330 also comprises a machine learning module 338. Machine learning module 338 can be configured to utilize suitable machine learning techniques to perform any suitable task within touch usage probability module 330. For example, machine learning module 338 can utilize one or more machine learning models, such as neural network models (e.g., feed-forward neural network models), to predict a touch usage probability. The machine learning models can be trained with labeled data using back propagation and any suitable cost function (e.g., mean squared error, mean absolute error, root mean squared error, etc.). The labeled data can comprise, for example, data from non-touch sensors and/or device state data (e.g., regarding peripheral devices that are attached, applications that are open, etc.), along with information regarding whether a touch input was used during such device state (or within a threshold time after such device state). After training, such a machine learning model can be used to obtain a probability of a touch input based at least on current non-touch sensor outputs and/or device state data. Further, the machine learning model can be retrained with updated data and/or new data associated with a different user. In other examples, machine learning module 338 may be omitted.

Touch usage probability module 330 also comprises user data 339. User data 339 can include user-specific touch data stored for one or more users of computing device 300. As a specific example, a particular user may have a pattern of using touch input while not looking at the display. Such touch behaviors can be stored in the user profile for this user in user data 339 and used to determine a touch usage probability for that user. Such data also can be used to update a machine learning model used to predict touch usage probabilities. In other examples, a touch usage probability module can have another configuration than that shown in FIG. 3.

Storage machine 326 also comprises a threshold module 340 configured to determine when a probability threshold condition is met. In some examples, threshold module 340 can adjust the probability threshold condition based at least on a state of power system 324 (e.g., external power supply connected or charge level of battery 328) or other factors.

Figure 4:
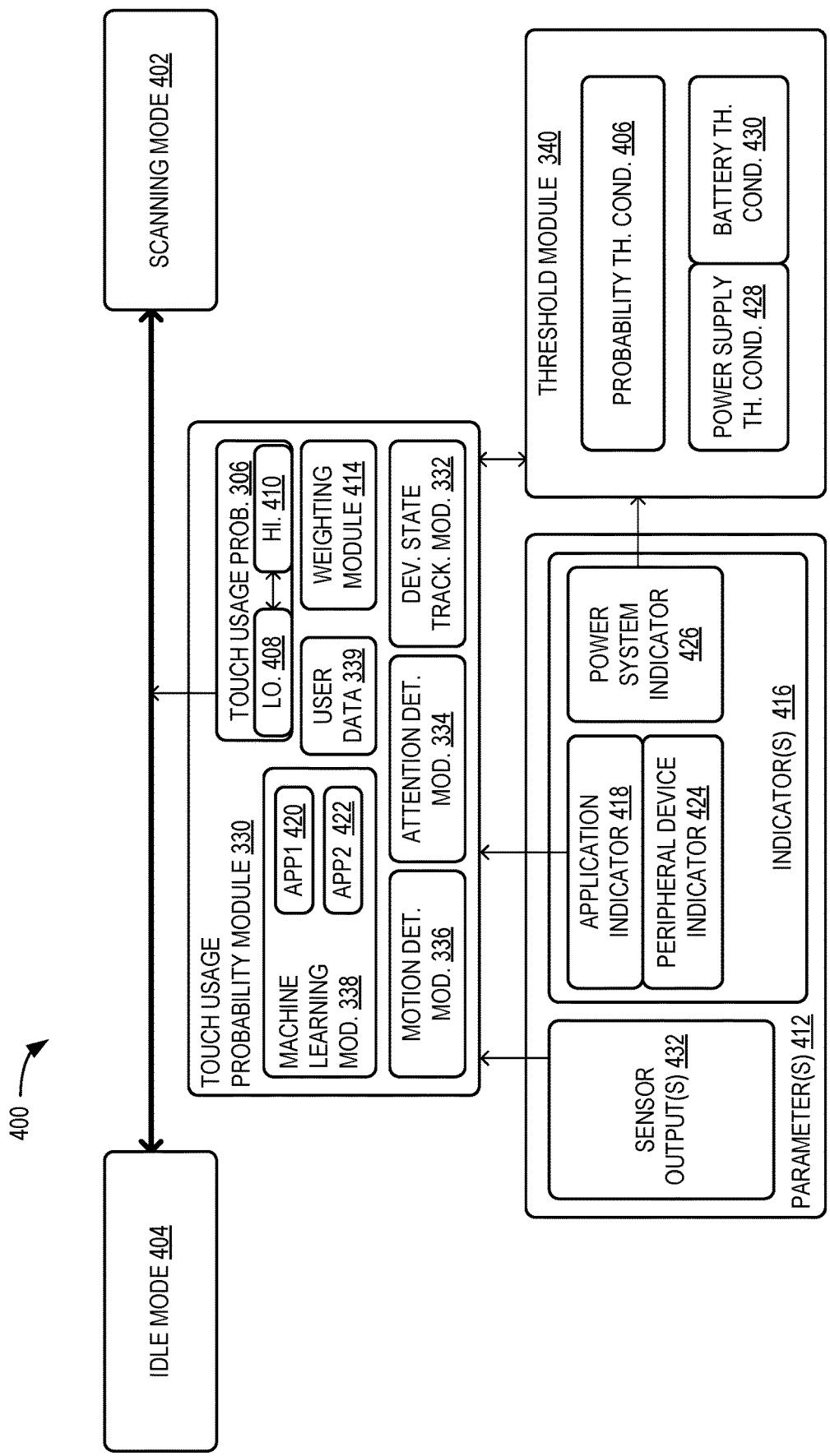
FIG. 4 schematically illustrates an example pipeline utilized by the computing device of FIG. 3 for determining a touch usage probability.

FIG. 4 schematically depicts an example pipeline 400 utilized by computing device 300 to determine a touch power mode for the operation of touch sensor 304. Here, a first touch power mode includes a scanning mode 402 for operating touch sensor 304 with a higher touch performance having shorter latency and higher accuracy when detecting a touch location and/or a pen location on display 302. A second touch power mode includes an idle mode 404 for operating touch sensor 304 with lower touch power than scanning mode 402. Idle mode 404 has longer latency and lower accuracy to help obtain the lower touch power. Briefly, computing device 300 utilizes pipeline 400 to change the operation of touch sensor 304 from idle mode 404 to scanning mode 402 based at least on touch usage probability 306 meeting a probability threshold condition 406. In the current example, touch usage probability 306 is considered to have a continuum from low 408 to high 410. Low 408 corresponds to a low likelihood of touch input and/or pen input on display 302. Likewise, high 410 corresponds to a high likelihood of touch input and/or pen input on display 302. In some examples, based at least on touch usage probability 306 no longer meeting probability threshold condition 406, touch sensor 304 can be changed from scanning mode 402 to operate in the idle mode 404. In other examples, a second probability threshold condition can be used to change touch sensor 304 from scanning mode 402 to operate in idle mode 404.

As previously mentioned, touch usage probability module 330 determines touch usage probability 306 based at least on a plurality of parameters 412. As discussed in more detail below, touch usage probability module 330 adjusts touch usage probability 306 towards low 408 or high 410 depending on the specified parameters. Here, touch usage probability 306 includes a value between 0 and 1 inclusive. Further, each parameter 412 of the plurality of parameters 412 can be assigned a relative weight-factor as determined by a weighting module 414. In such a manner some parameters may adjust touch usage probability 306 in different amounts than other parameters. In other examples, weighting module 414 can be omitted.

The plurality of parameters 412 includes a plurality of indicators 416, where each indicator 416 indicates a state of computing device 300. As one example, an application indicator 418 indicates an application being executed by processor 308, such as which or classification of the application, for example. Based at least on application indicator 418 indicating that a pen and touch application is being executed (e.g., a paint application or when a virtual keyboard is present on display 302), touch usage probability 306 is adjusted towards high 410. Alternatively, based at least on application indicator 418 indicating that a video application is being executed, touch usage probability 306 is adjusted toward low 408. In some examples, machine learning module 338 can learn a first touch behavior pattern during a first application 420, and a second touch behavior pattern during a second application 422. This can provide the possible benefit, for example of switching between an idle mode and a scanning mode, before a touch input is made, and thus provide a more accurate initial touch location sensing. While depicted here with two applications, machine learning module 338 can learn touch behavior patterns for any suitable number of applications or other use conditions of computing device 300 (e.g., workflows). In other examples, machine learning module 338 may be omitted.

Another example of an indicator 416 includes a peripheral device indicator 424 which indicates that one or more peripheral devices are connected to computing device 300. In some examples, peripheral device indicator 424 can include a list of connected peripheral devices (e.g., an external keyboard, a mouse, an external monitor, an attached keyboard, a docking station, a touch pad, a pen, and/or another suitable peripheral device). Further, peripheral device indicator 424 can also indicate a connection type of the peripheral device, such as wireless or wired, for example. More particularly, when an external keyboard or attached keyboard is not in the list of connected peripheral devices, touch usage probability 306 is adjusted towards high 410. Alternatively, touch usage probability 306 is adjusted towards low 408 based at least on peripheral device indicator 424 indicating that an external keyboard is connected. Further, based at least on peripheral device indicator 424 indicating that a pen is active (e.g., the pen is connected to computing device 300), the touch usage probability 306 is adjusted towards high 410. Additionally or alternatively, based at least on peripheral device indicator 424 indicating that an external monitor is connected to computing device 300, touch usage probability 306 is adjusted towards low 408. Further, peripheral device indicator 424 can indicate that the pen is being removed from a charger. In some such examples, touch usage probability module 330 can adjust touch usage probability 306 towards high 410 in response.

The plurality of indicators 416 also includes a power system indicator 426 that is indicative of a state of power system 324. The power system indicator 426 can be used by threshold module 340 to adjust probability threshold condition 406. More specifically, when power system indicator 426 includes an indicator that an external power supply is connected to computing device 300, threshold module 340 adjusts probability threshold condition 406 to utilize a power supply threshold condition 428. This helps to enable operating touch sensor 304 in scanning mode 402 (e.g., with the higher touch performance) for longer durations than when computing device 300 is on battery power. Alternatively, based at least on power system indicator 426 indicating that the external power supply is not connected, threshold module 340 adjusts probability threshold condition 406 to utilize a battery threshold condition 430 which may result in a shorter duration in scanning mode 402. In some examples, based at least on power system indicator 426 indicating that the external power supply is connected and a charge level of battery 328 meets a low-charge threshold condition, threshold module 340 may adjust probability threshold condition 406 to utilize battery threshold condition 430 or another suitable threshold condition. This can help computing device 300 to prioritize charging battery 328. Alternatively or additionally, power system indicator 426 can indicate that power system 324 is operating in a battery saving mode or another suitable operation of power system 324.

The plurality of parameters 412 further includes sensor outputs 432 from non-touch sensors 310. As one example, a user may be carrying computing device 300 from a first location to a second location while walking. In this example, motion determining module 336 can determine that a motion classification indicates motion traveling along a spatial path based at least on sensor output 432 from motion sensor 318. In some such examples, motion determining module 336 may further determine a duration of the motion sensed. Here, touch usage probability 306 can be adjusted towards low 408, or after a duration threshold condition is met. Further, in some examples where touch sensor 304 is operating in scanning mode 402, touch sensor 304 can be changed to operate in Idle mode 404. Other examples of motion classification include movement caused by a user running, sitting, or standing. As another example, a computing device connected to an attached keyboard (e.g., computing device 200 of FIG. 2B) may be placed in a bag with display 202 orientated parallel to the direction of gravity. In some such examples, the motion classification may indicate that display 202 is oriented vertically (e.g., parallel to the direction of gravity). Alternatively or additionally, a relative angle between a display and an attached keyboard can be determined using data from orientation sensor 320. In some such examples, based at least on the relative angle meeting an angle threshold condition (e.g., less than 45 degrees), touch usage probability 306 is adjusted towards low 408.

Figure 6:
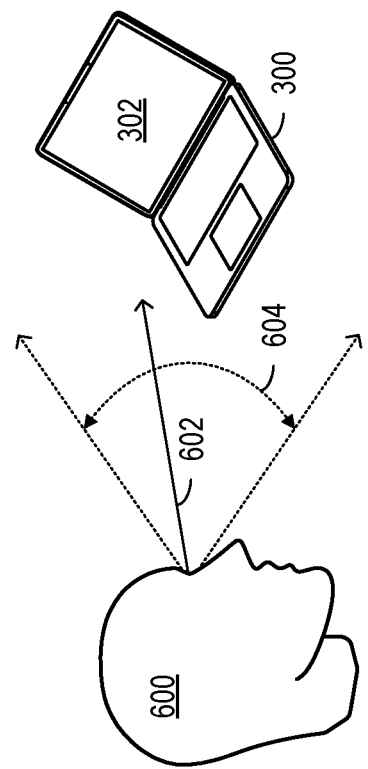
FIG. 6 schematically illustrates an example gaze direction of a user of the computing device of FIG. 3.
Figure 5:
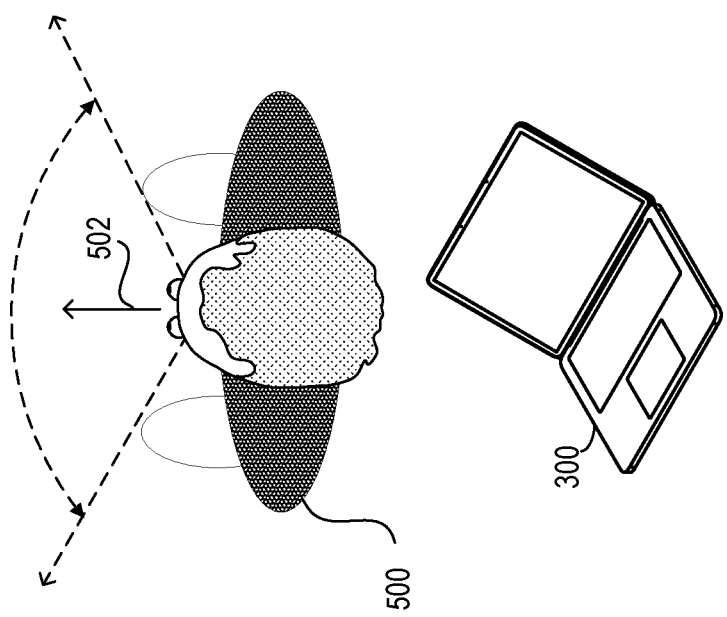
FIG. 5 schematically illustrates an example head direction of a user of the computing device of FIG. 3.

As previously discussed, a likelihood that a user is looking at display 302 can correlate to user attention. Attention determining module 334 can determine a head direction of a user of computing device 300 based at least on sensor output 432 from head tracking system 312. FIG. 5 schematically depicts a user 500 facing away from computing device 300 (depicted in FIG. 5 as a laptop). Here, a head direction 502 of user 500 is determined to face away from computing device 300. Therefore, touch usage probability 306 can be adjusted towards low 408. Alternatively or additionally, attention determining module 334 can utilize sensor output 432 from eye tracking system 314. FIG. 6 schematically depicts a user 600 looking at display 302 of computing device 300 (depicted here as a laptop). Here, a gaze direction 602 is determined to meet a gaze threshold condition 604, and therefore the user attention can be determined as high. In some such examples, touch usage probability 306 can also be adjusted towards high 410. In other such examples where application indicator 418 indicates that a video application is running, touch usage probability 306 can be adjusted towards low 408. In such a manner, different combinations of the user attention and application indicator 418 can adjust touch usage probability 306 in different manners. In other examples where a computing system comprises a first display coupled to a first touch sensor and a second display coupled to a second touch sensor, user attention can be determined separately for the first display and the second display. Such a configuration helps to enable the first touch sensor and the second touch sensor to operate in different touch power modes.

Returning to FIG. 4, touch usage probability module 330 can use any suitable combination of parameters 412, including those disclosed herein, to adjust touch usage probability 306. For example, a determined orientation of display 302 may have a different weight-factor and/or threshold condition based at least on peripheral device indicator 424 indicating that an external display is connected to computing device 300, than based at least on peripheral device indicator 424 indicating that the external display is not connected.

In some examples where the plurality of parameters 412 are interrupt based, touch usage probability module 330 can determine whether to update touch usage probability 306 in response to a change in the plurality of parameters 412 based at least on touch sensor 304 operating in idle mode 404. In some such examples, during scanning mode 402, touch usage probability module 330 may update touch usage probability 306 once during a scanning cycle of touch sensor 304. This can help to determine which touch power mode to use in a next scanning cycle of touch sensor 304. In such a manner, touch usage probability module 330 can help to perform a tradeoff between lower power consumption of touch sensor 304 and a higher touch performance and therefore, may help a user experience. FIGS. 4, 5, and 6 are illustrative. In other examples, another pipeline can be used for determining touch usage probability 306.

Figure 7:
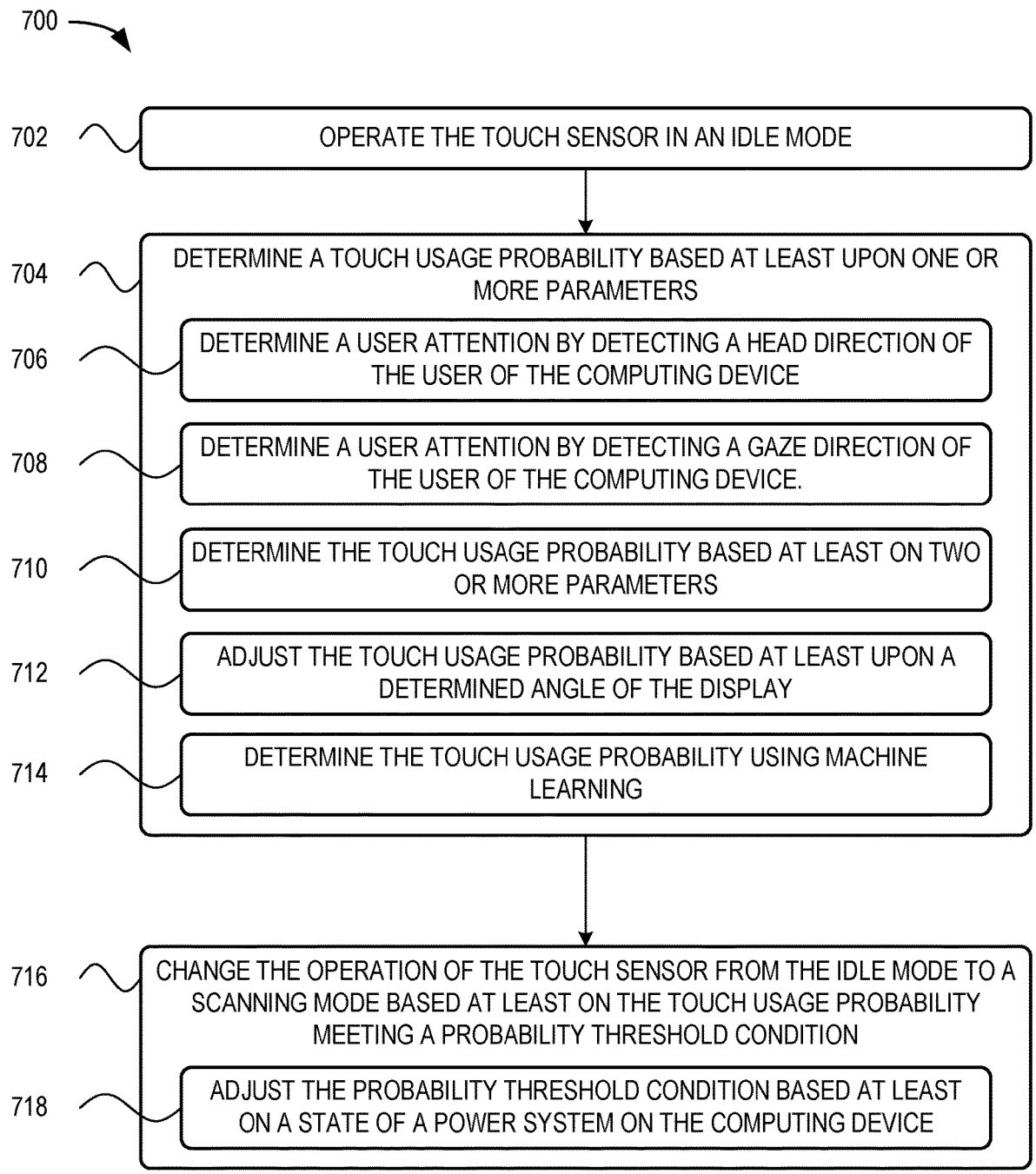
FIGS. 7-8 illustrate flow diagrams illustrating example methods for determining and utilizing a touch usage probability.

FIG. 7 illustrates a flow diagram of an example method 700 for determining and utilizing a touch usage probability. Method 700 can be performed on a computing device comprising a display, a touch sensor operatively coupled to the display, and at least one non-touch sensor, such as computing device 100, computing device 200, or computing device 300, for example. Method 700 includes, at 702, operating the touch sensor in an idle mode. The idle mode comprises a lower power mode and can also have a lower touch sensor performance compared to a higher power mode.

Method 700 includes, at 704, determining a touch usage probability based at least on one or more parameters. Each parameter of the one or more parameters comprises an output from a non-touch sensor or an indicator of a state of the computing device. In some examples, at least one parameter comprises an output from a camera. In some such examples, determining the touch usage probability includes determining a user attention by detecting a head direction of the user of the computing device using a head tracking system, as indicated at 706. Alternatively or additionally, determining the touch usage probability includes determining the user attention by detecting a gaze direction of the user using an eye tracking system, as indicated at 708. In other examples, two or more parameters can be used to determine the touch usage probability, as indicated at 710. In some examples, an additional parameter can be used to adjust the touch usage probability. Method 700 also comprises, at 712, adjusting the touch usage probability based at least upon a determined angle of the display using an output from an orientation sensor. Additionally, the touch usage probability can be determined using machine learning, as indicated at 714. In other examples, one or more of 706, 708, 710, 712, or 714 may be omitted.

Method 700 comprises, at 716, changing the operation of the touch sensor from the idle mode to a scanning mode based at least on the touch usage probability meeting a probability threshold condition. Here, the scanning mode comprises a higher power operation of the touch sensor having a higher touch sensor performance than the idle mode. Additionally, method 700 comprises, at 718, adjusting the probability threshold condition based at least upon a state of a power system of the computing device (e.g., external power supply connected or charge level of a battery) or other factors. In other examples, 718 may be omitted.

Figure 8:
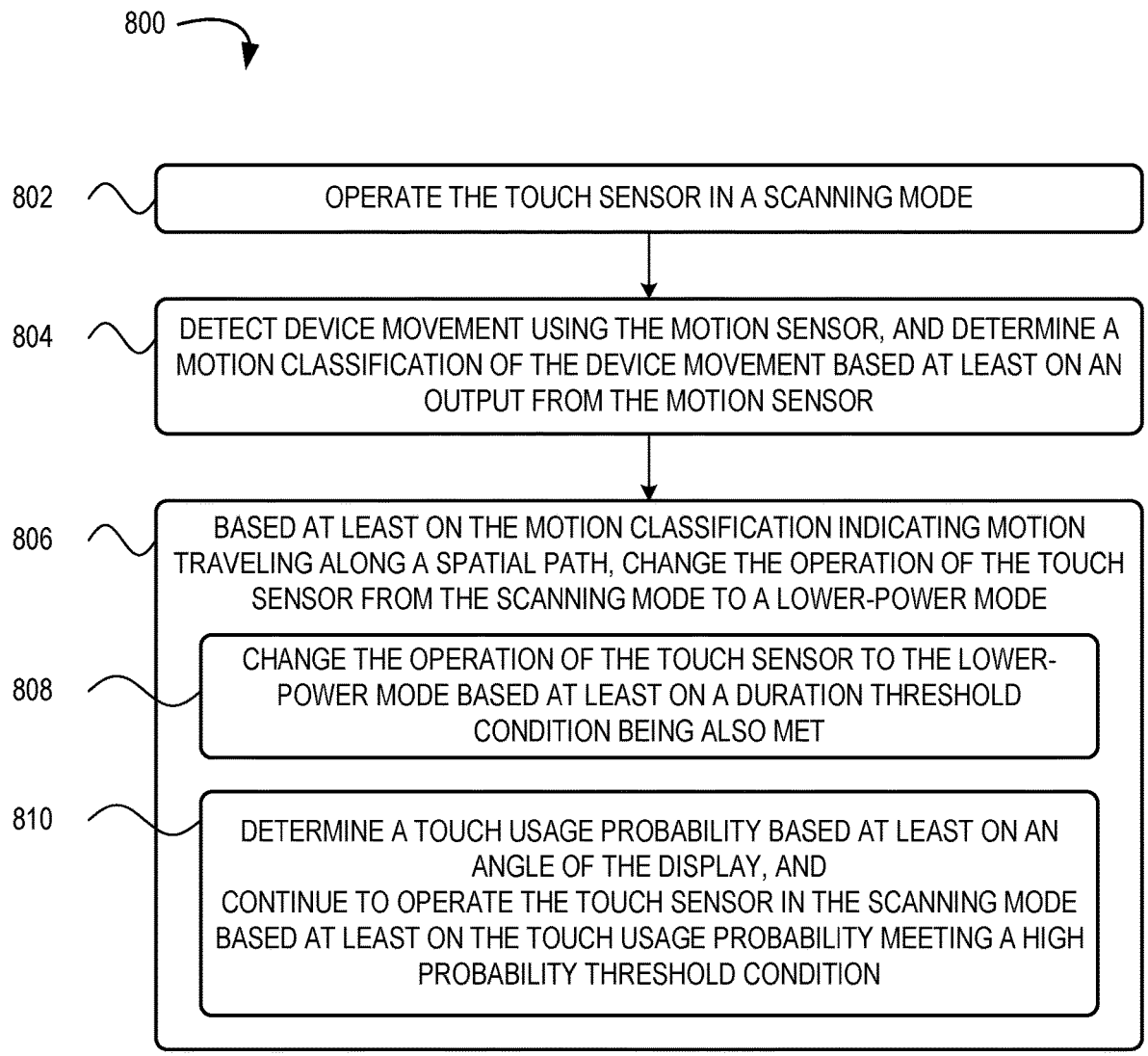

In method 700, the touch sensor changes from the idle mode to the scanning mode based at least on one or more parameters. Alternatively or additionally, the operation of the touch sensor can change based at least on data from a motion sensor. As a more specific example, when a motion sensor output indicates that a device is in motion (e.g., while a user is walking), it can be less likely that the user may intend to make a touch input. As such, FIG. 8 illustrates a flow diagram of an example method 800 for using data from a motion sensor to change operation of a touch sensor on a computing device. Method 800 can be performed by computing device 100, computing device 200, or computing device 300, for example. Method 800 comprises, at 802, operating the touch sensor in a scanning mode. Further, at 804, method 800 comprises detecting device movement using a motion sensor, and determining a motion classification of the device movement based at least on an output from the motion sensor.

Additionally, method 800 comprises, based at least on the motion classification indicating motion traveling along a spatial path, changing the operation of the touch sensor from the scanning mode to a lower-power mode, at 806. In some examples the lower-power mode can be the idle mode. In some examples, changing the operation of the touch sensor from the scanning mode to the lower-power mode includes changing the operation of the touch sensor to the lower-power mode based at least on a duration threshold condition being also met, as indicated at 808. For example, based at least on the motion being traveling along the spatial path and the duration threshold condition is met, the touch sensor can be changed to operate in the lower-power mode. In some examples, the computing device further comprises an orientation sensor configured to detect an angle of the display. In such examples, method 800 comprises determining a touch usage probability based at least on the angle of the display, and continuing operating the touch sensor in the scanning mode based at least on the touch usage probability meeting a high probability threshold condition, as indicated at 810. In such a configuration, based at least on the motion being traveling along the spatial path and the touch sensor is being used, the touch sensor can stay in the scanning mode. In other examples, 808 and/or 810 may be omitted. In such a manner, method 700 and/or method 800 can help to perform a tradeoff between lower power consumption of a touch sensor and a higher touch performance and therefore, may help a user experience.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
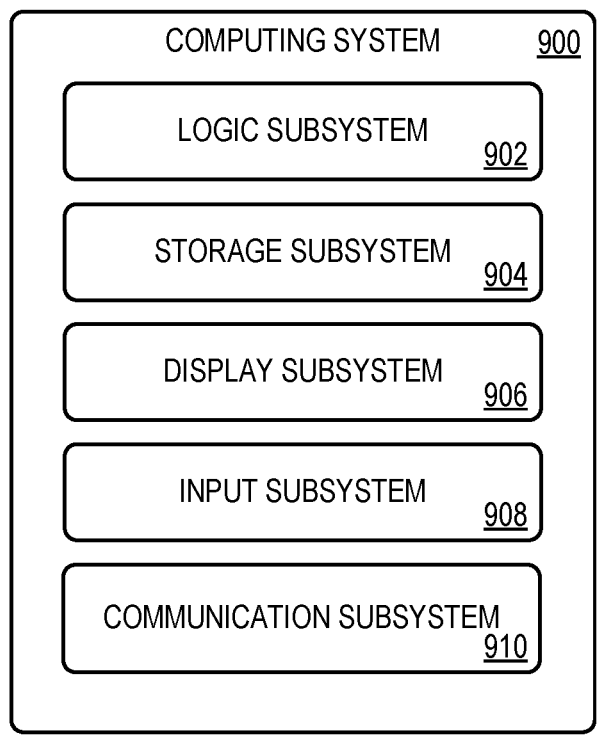
FIG. 9 depicts a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. Computing device 100, computing device 200, and computing device 300 are examples of computing system 900.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 904 includes one or more physical devices configured to hold instructions executable by the logic machine to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 may be integrated together into one or more hardware-logic components. Such hardware-logic components may include field-programmable gate arrays (FPGAs), program—and application-specific integrated circuits (PASIC/ASICs), program— and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic subsystem 902 executing instructions held by storage subsystem 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on—or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local—or wide-area network. In some embodiments, the communication subsystem may allow computing system 900 to send and/or receive messages to and/or from other devices via a network such as the Internet.

One examples provides a computing device comprising a display, a touch sensor operatively coupled to the display, a non-touch sensor configured to provide an output indicative of user engagement between the computing device and a user of the computing device, a logic machine, and a storage machine comprising instructions executable by the logic machine to determine a touch usage probability based at least upon the output from the non-touch sensor, and change the operation of the touch sensor between an idle mode and a scanning mode based at least on the touch usage probability meeting a probability threshold condition. In some such examples, the non-touch sensor alternatively or additionally includes a head tracking system, and the instructions executable to determine the touch usage probability alternatively or additionally include instructions executable to determine a user attention by detecting a head direction of the user of the computing device. In some such examples, the non-touch sensor alternatively or additionally includes an eye tracking system, and the instructions executable to determine the touch usage probability alternatively or additionally include instructions executable to determine a user attention by detecting a gaze direction of the user of the computing device. In some such examples, the instructions executable to determine the touch usage probability alternatively or additionally include instructions executable to adjust the touch usage probability further based at least on an indicator of a state of the computing device. In some such examples, the indicator of the state of the computing device alternatively or additionally comprises an indicator of an application that is being executed by the logic machine. In some such examples, the instructions executable to determine the touch usage probability alternatively or additionally include instructions executable to determine the touch usage probability using machine learning. In some such examples, the instructions are alternatively or additionally executable to adjust the probability threshold condition based at least upon a state of a power system of the computing device. In some such examples, the non-touch sensor alternatively or additionally includes a motion sensor, and the instructions are alternatively or additionally executable to detect device movement using the motion sensor, and determine a motion classification of the device movement based at least on an output from the motion sensor, and based at least on the motion classification indicating motion traveling along a spatial path, change the operation of the touch sensor from the scanning mode to a lower-power mode.

Another example provides a computing device comprising a display, a touch sensor operatively coupled to the display, a plurality of non-touch sensors, a logic machine, and a storage machine comprising instructions executable by the logic machine to operate the touch sensor in an idle mode, determine a touch usage probability based at least on two or more parameters, each parameter of the two or more parameters comprising an output from the plurality of non-touch sensors or an indicator of a state of the computing device, and change the operation of the touch sensor from the idle mode to a scanning mode based at least on the touch usage probability meeting a probability threshold condition. In some such examples, the two or more parameters alternatively or additionally include an indicator that a peripheral device is connected to the computing device. In some such examples, the plurality of non-touch sensors alternatively or additionally includes an orientation sensor, and the instructions executable to determine the touch usage probability of the display alternatively or additionally include instructions executable to adjust the touch usage probability based at least upon a determined angle of the display. In some such examples, the plurality of non-touch sensors alternatively or additionally includes a motion sensor, and the instructions are alternatively or additionally executable to detect device movement using the motion sensor, and determine a motion classification of the device movement based at least on an output from the motion sensor, and based at least on the motion classification indicating motion traveling along a spatial path, change the operation of the touch sensor from the scanning mode to a lower-power mode. In some such examples, alternatively or additionally at least one parameter comprises an indicator of an application that is being executed by the logic machine. In some such examples, alternatively or additionally at least one parameter comprises an indicator of a charge state of a battery of the computing device. In some such examples, the instructions executable to determine the touch usage probability of the display alternatively or additionally include instructions executable to determine the touch usage probability using machine learning. In some such examples, alternatively or additionally at least one non-touch sensor of the plurality of non-touch sensors is configured to provide an output indicative of user engagement between the computing device and a user of the computing device, the instructions are alternatively or additionally executable to determine a user attention based at least on the output indicative of the user engagement, and the instructions executable to determine the touch usage probability of the display alternatively or additionally include instructions to adjust the touch usage probability based at least on the user attention. In some such examples, the instructions are alternatively or additionally executable to adjust the probability threshold condition based at least on a state of a power system on the computing device.

Another example provides a computing device comprising a display, a touch sensor operatively coupled to the display, a motion sensor, a logic machine, and a storage machine comprising instructions executable by the logic machine to operate the touch sensor in a scanning mode, detect device movement using the motion sensor, and determine a motion classification of the device movement based at least on an output from the motion sensor, and based at least on the motion classification indicating motion traveling along a spatial path, change the operation of the touch sensor from the scanning mode to a lower-power mode. In some such examples, the instructions executable to change the operation of the touch sensor from the scanning mode to the lower-power mode alternatively or additionally include instructions executable to change the operation of the touch sensor to the lower-power mode based at least on a duration threshold condition being also met. In some such examples, the computing device alternatively or additionally comprises an orientation sensor configured to detect an angle of the display, and wherein the instructions are alternatively or additionally executable to determine a touch usage probability based at least on the angle of the display, and continue to operate the touch sensor in the scanning mode based at least on the touch usage probability meeting a high probability threshold condition.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   a display;
   a touch sensor operatively coupled to the display;
   a non-touch sensor configured to provide an output indicative of user engagement between the computing device and a user of the computing device;
   a logic machine; and
   a storage machine comprising instructions executable by the logic machine to
      determine a touch usage probability based at least upon the output from the non-touch sensor, and
      change the operation of the touch sensor between an idle mode and a scanning mode based at least on the touch usage probability meeting a probability threshold condition.

2. The computing device of claim 1, wherein the non-touch sensor includes a head tracking system, and the instructions executable to determine the touch usage probability include instructions executable to determine a user attention by detecting a head direction of the user of the computing device.

3. The computing device of claim 1, wherein the non-touch sensor includes an eye tracking system, and the instructions executable to determine the touch usage probability include instructions executable to determine a user attention by detecting a gaze direction of the user of the computing device.

4. The computing device of claim 1, wherein the instructions executable to determine the touch usage probability include instructions executable to adjust the touch usage probability further based at least on an indicator of a state of the computing device.

5. The computing device of claim 4, wherein the indicator of the state of the computing device comprises an indicator of an application that is being executed by the logic machine.

6. The computing device of claim 1, wherein the instructions executable to determine the touch usage probability include instructions executable to determine the touch usage probability using machine learning.

7. The computing device of claim 1, where the instructions are further executable to adjust the probability threshold condition based at least upon a state of a power system of the computing device.

8. The computing device of claim 1, wherein the non-touch sensor includes a motion sensor, and the instructions are further executable to
   detect device movement using the motion sensor, and determine a motion classification of the device movement based at least on an output from the motion sensor, and
   based at least on the motion classification indicating motion traveling along a spatial path, change the operation of the touch sensor from the scanning mode to a lower-power mode.

9. A computing device comprising:
   a display;
   a touch sensor operatively coupled to the display;
   a plurality of non-touch sensors;
   a logic machine; and
   a storage machine comprising instructions executable by the logic machine to
      operate the touch sensor in an idle mode,
      determine a touch usage probability based at least on two or more parameters, each parameter of the two or more parameters comprising an output from the plurality of non-touch sensors or an indicator of a state of the computing device, and
      change the operation of the touch sensor from the idle mode to a scanning mode based at least on the touch usage probability meeting a probability threshold condition.

10. The computing device of claim 9, wherein the two or more parameters include an indicator that a peripheral device is connected to the computing device.

11. The computing device of claim 9, wherein the plurality of non-touch sensors includes an orientation sensor, and the instructions executable to determine the touch usage probability of the display include instructions executable to adjust the touch usage probability based at least upon a determined angle of the display.

12. The computing device of claim 9, wherein the plurality of non-touch sensors includes a motion sensor, and the instructions are further executable to
   detect device movement using the motion sensor, and determine a motion classification of the device movement based at least on an output from the motion sensor, and
   based at least on the motion classification indicating motion traveling along a spatial path, change the operation of the touch sensor from the scanning mode to a lower-power mode.

13. The computing device of claim 9, wherein at least one parameter comprises an indicator of an application that is being executed by the logic machine.

14. The computing device of claim 9, wherein at least one parameter comprises an indicator of a charge state of a battery of the computing device.

15. The computing device of claim 9, wherein the instructions executable to determine the touch usage probability of the display include instructions executable to determine the touch usage probability using machine learning.

16. The computing device of claim 15, wherein
   at least one non-touch sensor of the plurality of non-touch sensors is configured to provide an output indicative of user engagement between the computing device and a user of the computing device,
   the instructions are further executable to determine a user attention based at least on the output indicative of the user engagement, and
   the instructions executable to determine the touch usage probability of the display include instructions to adjust the touch usage probability based at least on the user attention.

17. The computing device of claim 9, where the instructions are further executable to adjust the probability threshold condition based at least on a state of a power system on the computing device.

18. A computing device comprising:
   a display;
   a touch sensor operatively coupled to the display;
   a motion sensor;
   a logic machine; and
   a storage machine comprising instructions executable by the logic machine to
      operate the touch sensor in a scanning mode,
      detect device movement using the motion sensor, and determine a motion classification of the device movement based at least on an output from the motion sensor, and
      based at least on the motion classification indicating motion traveling along a spatial path, change the operation of the touch sensor from the scanning mode to a lower-power mode.

19. The computing device of claim 18, wherein the instructions executable to change the operation of the touch sensor from the scanning mode to the lower-power mode include instructions executable to change the operation of the touch sensor to the lower-power mode based at least on a duration threshold condition being also met.

20. The computing device of claim 18, further comprising an orientation sensor configured to detect an angle of the display, and wherein the instructions are further executable to
   determine a touch usage probability based at least on the angle of the display, and
   continue to operate the touch sensor in the scanning mode based at least on the touch usage probability meeting a high probability threshold condition.

* * * * *